United States Patent
Liu et al.

(10) Patent No.: US 11,898,928 B2
(45) Date of Patent: Feb. 13, 2024

(54) LARGE CORE APPARATUS FOR MEASURING OPTICAL POWER IN MULTIFIBER CABLES

(71) Applicant: AFL Telecommunications LLC, Duncan, SC (US)

(72) Inventors: Bin Liu, Chestnut Hill, MA (US); Scott Prescott, Belmont, NH (US); Dale Eddy, Gilford, NH (US); Shawn P. Collins, Pembroke, NH (US)

(73) Assignee: AFL Telecommunications LLC, Duncan, SC (US)

( * ) Notice: Subject to any disclaimer, the term of this patent is extended or adjusted under 35 U.S.C. 154(b) by 127 days.

(21) Appl. No.: 17/296,164

(22) PCT Filed: Nov. 26, 2019

(86) PCT No.: PCT/US2019/063141
§ 371 (c)(1),
(2) Date: May 21, 2021

(87) PCT Pub. No.: WO2020/112704
PCT Pub. Date: Jun. 4, 2020

(65) Prior Publication Data
US 2022/0011194 A1   Jan. 13, 2022

Related U.S. Application Data

(60) Provisional application No. 62/771,857, filed on Nov. 27, 2018.

(51) Int. Cl.
*G01M 11/00* (2006.01)

(52) U.S. Cl.
CPC .......... *G01M 11/33* (2013.01); *G01M 11/31* (2013.01)

(58) Field of Classification Search
CPC ...... G01M 11/00; G01M 11/02; G01M 11/22; G01M 11/31; G01M 11/33; G01M 11/30
See application file for complete search history.

(56) References Cited

U.S. PATENT DOCUMENTS

2003/0174313 A1*  9/2003  He .................. G01M 11/33
                                                    356/73.1
2018/0172552 A1   6/2018  Adam

FOREIGN PATENT DOCUMENTS

JP      S56108933 A    8/1981
JP      S63131044 A    6/1988
(Continued)

OTHER PUBLICATIONS (https://www.fiberopticcableshop.com/smsim.html) Sep. 28, 2015 (Year: 2015).*

(Continued)

*Primary Examiner* — Tarifur R Chowdhury
*Assistant Examiner* — Carlos Perez-Guzman
(74) *Attorney, Agent, or Firm* — Dority & Manning, P.A.

(57) ABSTRACT

An optical power meter unit includes a transmitting/receiving port configured to connect to a fiber under test. The optical power meter unit also includes a light source and an optical power meter. The optical power meter unit further includes an optical fiber extending between the transmitting/receiving port and the optical power meter. The optical fiber has a core size greater than a core size of the fiber under test.

15 Claims, 5 Drawing Sheets

(56) References Cited

FOREIGN PATENT DOCUMENTS

| | | | | |
|---|---|---|---|---|
| WO | WO-2016200790 A1 | * | 12/2016 | ............ G01M 11/30 |
| WO | WO-2017116781 A1 | * | 7/2017 | ............ G01M 11/33 |

OTHER PUBLICATIONS (https://www.fiberopticcableshop.com/mmsim50.html) Nov. 28, 2015 (Year: 2015).*
International Patent Application No. PCT/US2019/063141; International Search Report; dated Apr. 3, 2020; (2 pages).

* cited by examiner

LARGE CORE APPARATUS FOR MEASURING OPTICAL POWER IN MULTIFIBER CABLES

CROSS-REFERENCE TO RELATED APPLICATIONS

This application is a National Stage Patent Application of PCT/US2019/063141, filed on Nov. 26, 2019, which claims the benefit of priority to U.S. Provisional Application No. 62/771,857, filed Nov. 27, 2018, the disclosures of all of which are incorporated by reference herein in their entireties.

FIELD OF THE INVENTION

The present disclosure relates generally to optical fiber test apparatus, and more particularly to optical power meter units having at least one enlarged fiber core for testing fiber optic cables incorporating multiple fibers.

BACKGROUND OF THE INVENTION

Light source/power meter (LSPM) methods are generally known and utilized in the fiber optics industry to measure the insertion losses of the optical fibers in fiber optic cables. Typically, a fiber optic cable under test may be connected between two test cables. One test cable is connected to a light source, and the other test cable is connected to an optical power meter. Light is transmitted from the light source through the test cables and fiber optic cable to the power meter, and the loss in an optical fiber of the fiber optic cable is determined based on the measured power at the power meter and the power measured by referencing the light source to the power meter directly.

International standards require loss testing for both cable installation and maintenance, including multifiber optic cables, such as cables terminated by multifiber push-on ("MPO") connectors. Typically, the MPO connector is connected to a power meter for such testing. In some cases, the power meter is equipped with a large area photodetector. In other cases, the power meter has a fiber array which mates with the connecter. In the case of MPO connectors utilizing the former case, light from the MPO fibers is directed on the photodetector through free space. However, the gap between the end face of the connector and the detector must be small enough to capture all light. Therefore, a pinned (male) MPO connector cannot be connected to such a power meter and measured. For the latter case, light from the fibers of the MPO connector are guided through the contacted array, e.g., a mated MPO fanout cable, and transmitted to separate photodetectors. However, due to manufacturing tolerances, mechanical misalignment errors, and other reasons, the insertion loss between the MPO connector and such an interface may significantly vary between fibers, and even between each connecting action. Therefore, these insertion loss errors could hinder a precise optical power measurement and compromise subsequent loss measurement accuracy. For example, these errors could compromise the loss measurement accuracy and indicate a false failure condition.

Accordingly, improved optical connection apparatus and assemblies for measuring optical power in multifiber cables is desired in the art. In particular, optical connection apparatus and assemblies which facilitate accurate loss testing and address the above-stated issues would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an optical power meter unit is provided. The optical power meter unit includes a transmitting/receiving port configured to connect to a fiber under test. The optical power meter unit also includes a light source and an optical power meter. The optical power meter unit further includes an optical fiber extending between the transmitting/receiving port and the optical power meter. The optical fiber has a core size greater than a core size of the fiber under test.

In accordance with another embodiment, an optical power meter unit is provided. The optical power meter unit includes a transmitting/receiving port configured to connect to a fiber under test. The optical power meter unit also includes a light source and an optical power meter. The optical power meter unit further includes an optical branching device connecting the light source and the optical power meter to the transmitting/receiving port. The optical branching device includes a first branch extending between the transmitting/receiving port and the optical power meter and a second branch extending between the transmitting/receiving port and the light source. A core size of the first branch is greater than a core size of the second branch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1A:
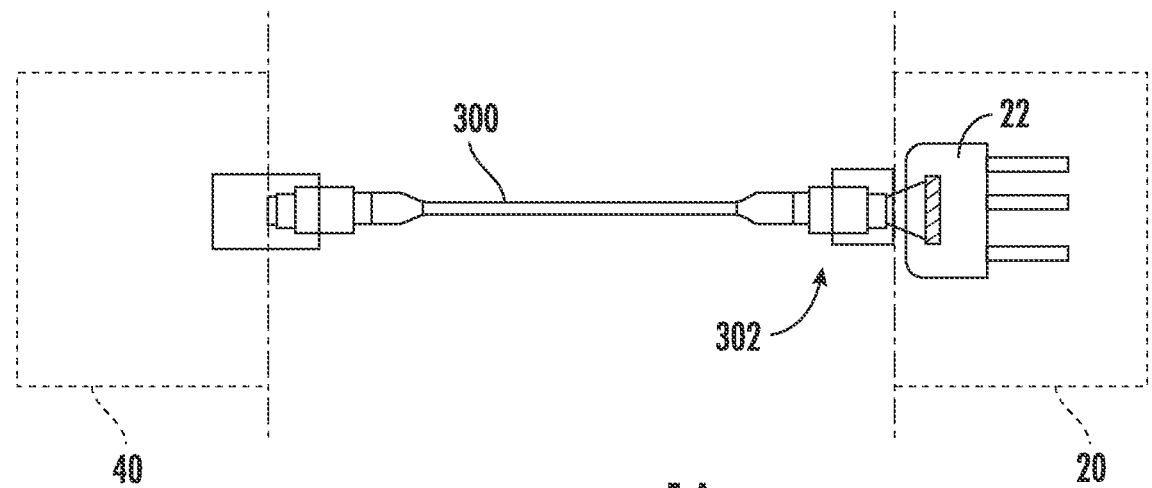
FIGS. 1A and 1B illustrate exemplary interfacing mechanisms facilitating the optical connection between a fiber optic cable connector and an optical power meter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A test apparatus may include, for example, an optical power meter. The optical power meter is operable to detect and measure the power of light at one or more predetermined wavelengths or ranges of wavelengths. The detected and measured light is, in exemplary embodiments, light on the infrared wavelength spectrum. Common wavelengths (i.e., those utilized in multimode optical fibers) include 850 nanometers and/or 1300 nanometers. In general, an optical power meter may be or include a measurement circuit or photodetector. The measurement circuit may generally convert a received signal for measurement and/or display purposes. For example, the measurement circuit may convert a received optical signal into an electrical signal. The electrical signal may further be sent to an analog to digital converter. The resulting electrical signal may be displayed as a power meter output.

The apparatus may further include, for example, a controller. The controller may include memory and one or more processing devices such as microprocessors, CPUs or the like, such as general or special purpose microprocessors operable to execute programming instructions or microcontrol code associated with operation of the power meter and/or the test apparatus generally (including operation of the closed-loop feedback mechanism). The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 1B:
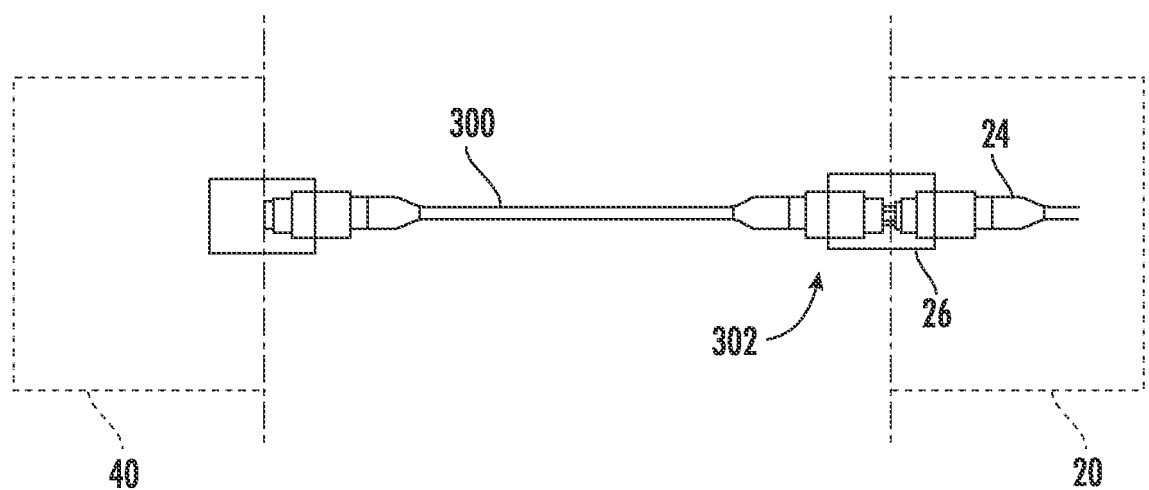

Turning now to the drawings, FIGS. 1A and 1B illustrate exemplary interfacing mechanisms facilitating the optical connection between a fiber optic cable connector 302 and a test apparatus, e.g., an optical power meter 20. For example, as shown in FIG. 1A, a fiber optic cable 300 comprising multiple optical fibers, e.g., a multifiber cable, includes a connector 302 which may, for example, be a multifiber push-on connector ("MPO" connector). As illustrated in FIG. 1A, the MPO connector 302 is connected to an optical power meter 20 equipped with a large area photo detector 22. In this example, lights from the fibers of the MPO connector 302 directly fall upon the large area photo detector 22 of the optical power meter 20 through free space.

Another example is illustrated in FIG. 1B, which includes an optical power meter 20 having a fiber/waveguide array 24 to mate with the MPO connecter 302. For this example, the MPO connector 302 is connected to a mated MPO connector 26. The light is guided through the fiber/waveguide array, e.g., an MPO fanout 24, and transmitted to separate photo detectors.

Figure 2A:
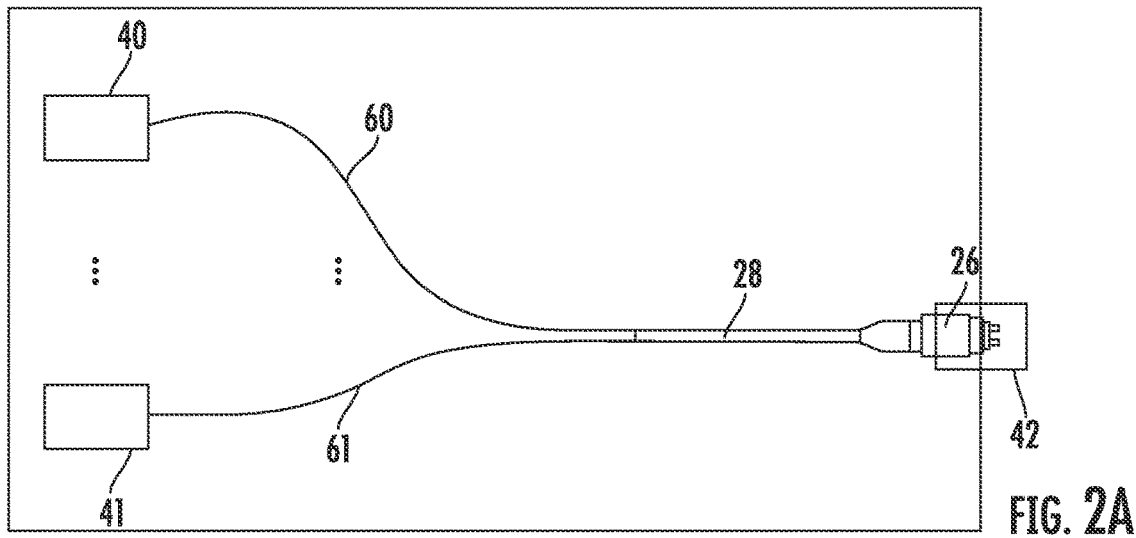
FIGS. 2A, 2B, and 2C provide diagrammatic illustrations of exemplary optical power meter unit configurations.
Figure 2B:
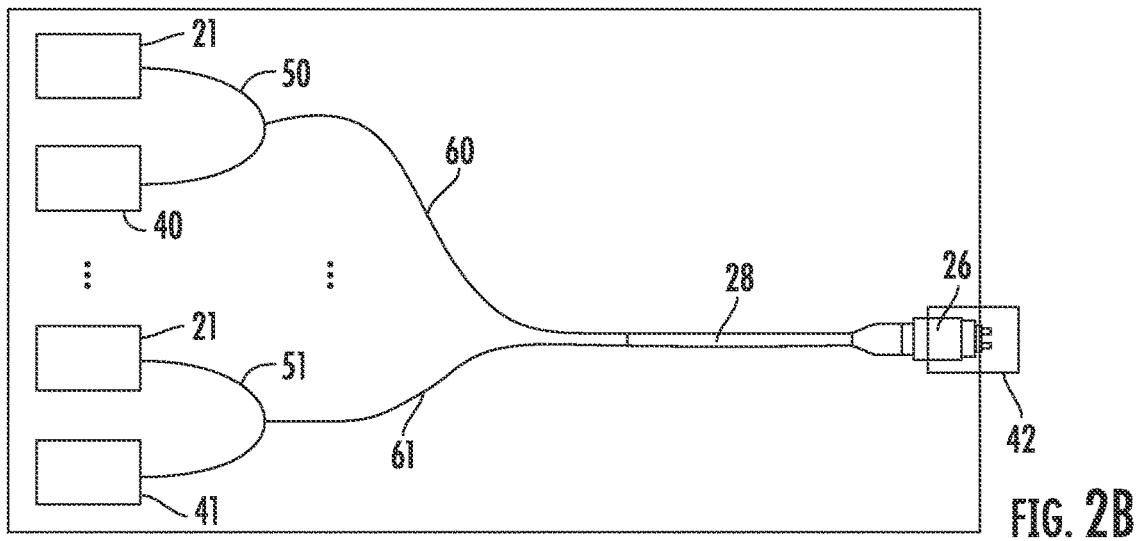
Figure 2C:
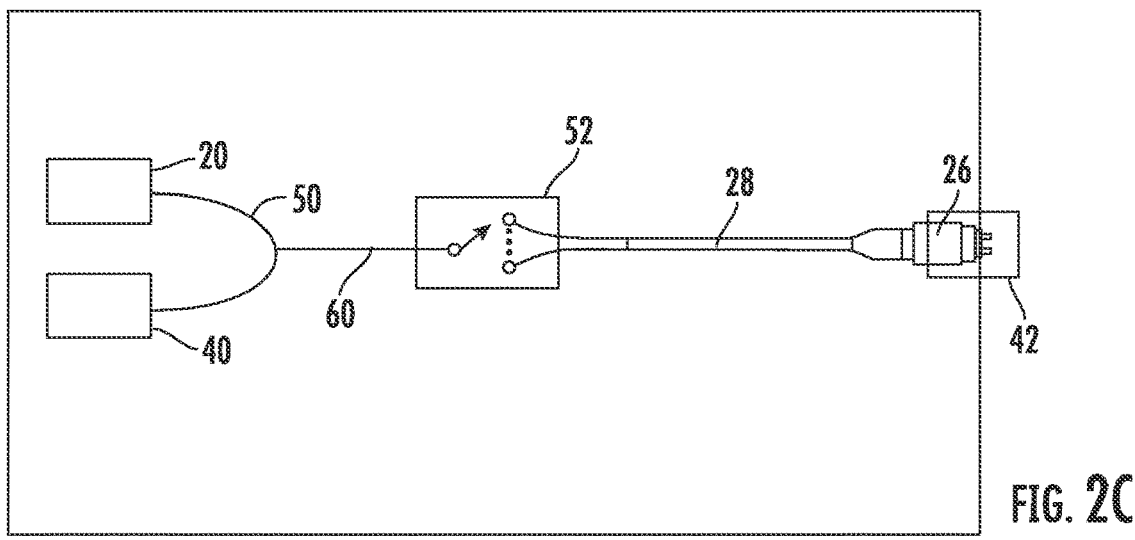

Further details of various exemplary optical power meter units, each including an MPO connector 26, are illustrated in FIGS. 2A-2C. Such optical power meter units may be used, for example, as a light source only, a power meter only, or both a light source and a power meter, to measure the MPO loss, optical return loss (ORL), and/or length over a distance 304 of a fiber under test, e.g., an MPO cabling under test 300 extending between opposing testing interfaces 300A and 300B, as illustrated in FIG. 4. The optical power meter unit may comprise a light source (LS) unit 40 having an MPO output port as shown in FIGS. 2A-2C, and an MPO optical power meter (PM) unit 200 as shown, for example, in FIG. 3. In the MPO light source unit, an MPO fanout constitutes the transmitting/receiving (TR) port 42 of the source. Each fanout fiber 60, 61 is linked to an individual light source 40, 41, as shown in FIG. 2A, which can work in single, dual, or multiple wavelengths, e.g., 1310 nm & 1550 nm. To facilitate the ORL measurement, an array of optical power meters, $PM_n$, 20, 21 may be employed and paired with corresponding light sources 40, 41 through optical branching devices 50, 51, e.g., 1×2 couplers, as shown in FIG. 2B. Alternatively, as shown in FIG. 2C, a 1 by n optical switch 52 is employed to connect a single fiber 60 and an individual MPO fiber 28, and switch between connecting the single fiber 60 with each of the plurality of fibers of the MPO fiber 28, one at a time. This arrangement only needs a pair of LS 40 and PM 20, and one optical branching device 50. However, more than one pair of LS 40 and PM 20 and a corresponding number of optical branching devices 50 may also be included in other embodiments. Noteworthy, the type of fibers with the MPO source unit is usually selected to be consistent with the type of the cabling under test, e.g., singlemode or multimode.

Figure 3:
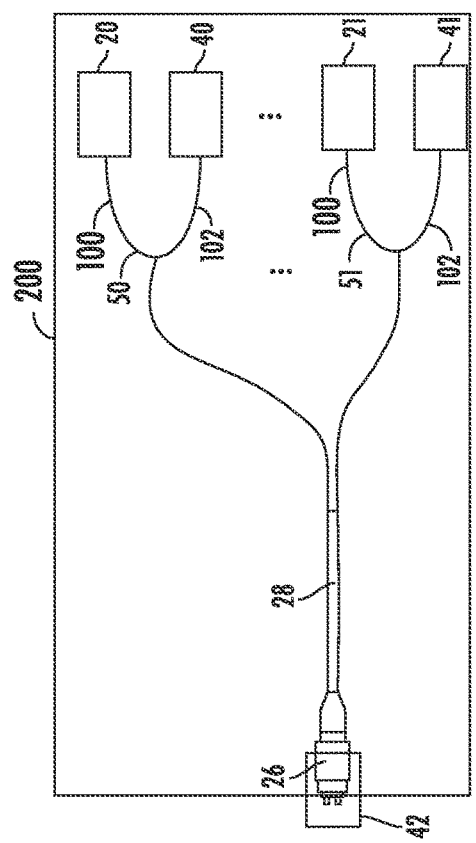
FIG. 3 provides a diagrammatic illustration of another exemplary optical power meter unit configuration.
Figure 4:
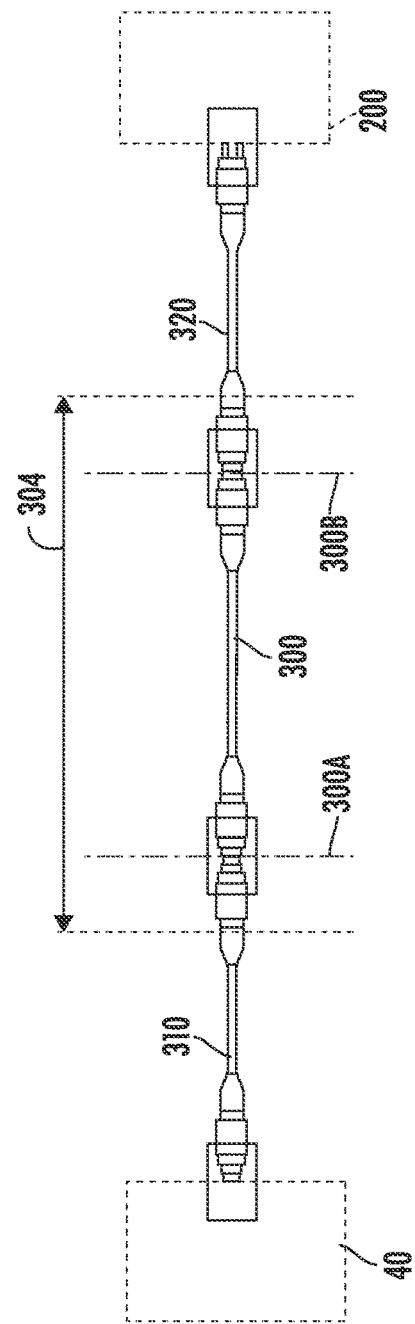
FIG. 4 is a schematic illustrating a testing configuration such as may be used in optical loss testing and which may incorporate one or more optical power meter units in accordance with one or more embodiments of the present disclosure.

FIG. 3 diagrammatically illustrates an exemplary configuration of an optical power meter unit 200 according to one or more embodiments of the present disclosure. As illustrated in FIG. 3, the optical power meter unit 200 includes a transmitting/receiving port T/R 42, for example, the T/R port 42 may include an MPO connector 26, similar to the example illustrated in FIGS. 2A-2C, and at least one optical power meter (PM) 20. For example, the exemplary optical power meter unit 200 illustrated in FIG. 3 comprises an array of light source and power meter (LSPM) 40/20 pairs. The light sources 40, 41 may primarily work in a single wavelength, e.g., 1310 nm, to facilitate data communications between the MPO light source unit and the MPO power meter unit, and to facilitate the length measurement. An optical fiber extends between the T/R port 42 and the at least one PM 20. As illustrated in FIG. 3, in some embodiments, an array of optical branching devices 50, 51 may connect each LS/PM 40/20 to the T/R port 42, where the optical fiber 100 extending between the T/R port 42 and the PM 20 may be or include one branch of the optical branching device 50. In particular, the core size of fibers within the fanout 24 and optical branching devices 50, 51 may be larger than the core size of the MPO light source unit and the MPO cable under test 300. For example, for a singlemode MPO cable testing, fibers of the T/R port 42 and within the MPO PM unit can be fibers with 50 μm or 62.5 μm core size. If the source unit and the cabling under test 300 is 50 μm multimode fiber type, fibers of the MPO power meter unit 200 may be larger than 50 μm, e.g., 62.5 μm. In some embodiments, the optical branching device 50 may include a second branch 102, e.g., a second optical fiber extending between the T/R port 42 and the LS 41. A core size of the second branch, e.g., the second optical fiber 102, may be less than the core size of the first branch 100, e.g., of the optical fiber extending between the transmitting/receiving port 42 and the optical power meter 20. Such an optical arrangement where the core size of the fiber 100 extending to the PM 20 is greater than the core size of the fiber under test 300 can maximize the light coupling coefficient from the fiber under test 300 into the power meter 20, hence significantly reducing the insertion loss of the MPO connection 302. Therefore, the loss measurement accuracy can be improved.

After proper referencing procedures, the light source unit and the power meter unit 200 are linked to the MPO cable under test 300 through MPO test cords (J1) 310 and (J2) 320 as shown in FIG. 4. The fiber type of the test cords 310, 320 can match the type of cable under test 300. With this setup, the loss, ORL and fiber length of the cable under test 300 can be obtained. To ensure accurate measurement of loss, it is required that the test cord (J1) 310 shall never be disconnected from the T/R port 42 of the source unit throughout the whole reference test procedure.

Figure 5A:
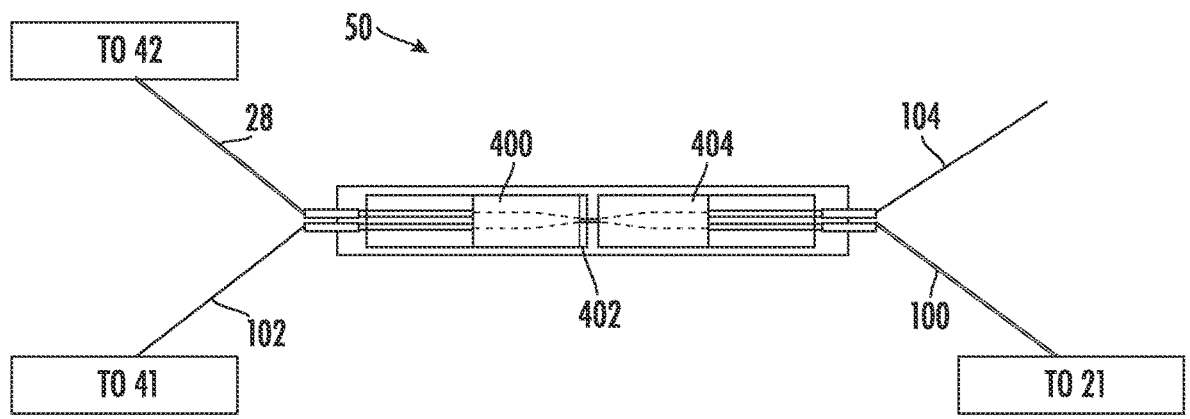
FIGS. 5A and 5B provide diagrammatic illustrations of exemplary optical branching devices which may be incorporated in an optical power meter unit according to one or more embodiments of the present disclosure.
Figure 5B:
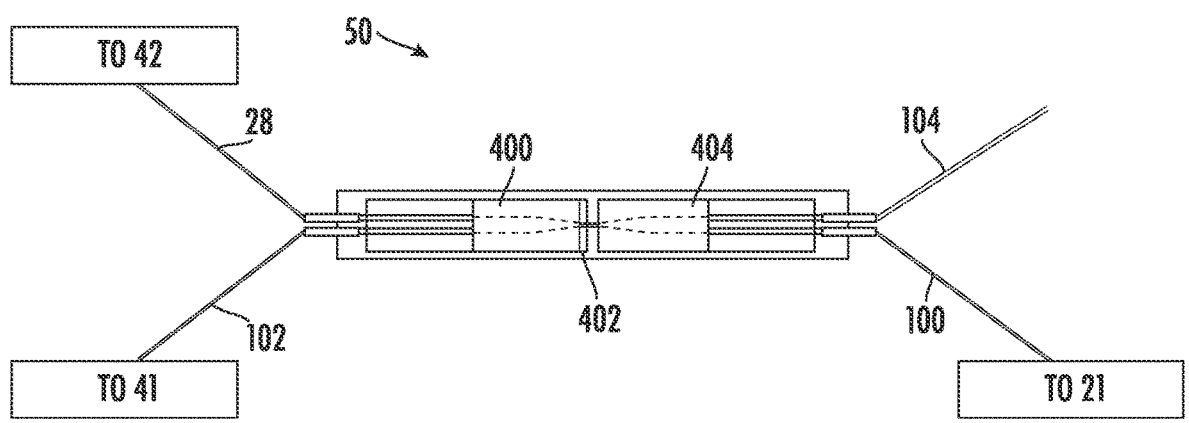

In some embodiments, the optical power meter unit 200 may include an optical branching device 50 such as any one of the example optical branching devices illustrated in FIGS. 5A and 5B. To achieve a high accuracy loss measurement, and a wide-range ORL measurement, the optical branching devices 50 in the power meter unit 200 may need special designs and configurations, such as the configuration depicted in FIG. 5A for singlemode MPO cabling test or the configuration depicted in FIG. 5B for multimode/singlemode MPO cabling test. In such embodiments, the optical branching device 50 may include at least one collimator 400 and a beam splitter 402 optically aligned with the collimator 400. For example, as illustrated in FIGS. 5A and 5B, the optical branching device 50 may include a pair of optical collimators 400 and 404 with fiber pigtails 28, 100, 102, and 104 and a beam splitter 402. The optic fiber pigtails 28, 100, 102, and 104, e.g., branches of the optical branching device 50, may have designated core sizes, e.g., at least one of the optic fiber pigtails 28, 100, 102, and 104 may include a large core optical fiber having a core size greater than a core size of the fiber under test 300. The collimators 400 and 404 generally collimate, or align, light being transmitted therethrough. For example, in exemplary embodiments as shown, each collimator 400 and 404 includes a fiber ferrule and a collimating lens. The lens may, in some embodiments, be a graded-index (GRIN) lens. Alternatively, other suitable glass lenses or lenses formed from other suitable materials may be utilized. Collimators 400 and 404 may, in some embodiments, further include ferrules. The ferrule of each collimator 400 and 404 may be connected to and/or otherwise optically aligned with an end of the respective lens, as shown. In exemplary embodiments, the ferrule may be a dual fiber ferrule, and thus define two parallel channels extending therethrough. Each channel may accommodate an optical fiber therein for connection to the collimator, as discussed herein. Alternatively, the ferrule may include one, three or more channels. In an exemplary embodiment, one collimator 400 has a dual fiber ferrule with a Graded Index (GRIN) lens, and houses two optical fibers that have designated core sizes. For example, a first one 28 of the optical fibers may extend between the T/R port and the optical branching device 50, e.g., may link the first collimator 400 to the T/R port, and this optical fiber 28 may have a larger core size than the MPO cabling under test 300. A second optical fiber 102 may link to the LS$_n$, and may have the same core size as the MPO cabling under test 300, e.g., the core size of the second optical fiber 102 may be less than the core size of the first optical fiber 28. However, the second optical fiber 102 may also have a larger core size than the cable under test 300.

The beam splitter 402 can be glasses, optical film coating, a cubic, or any other feasible components, which can split the incident light into two paths, normally named as the reflection path and the transmission path. The beam splitter 402 may be optically aligned with, and in some embodiments connected to, the first collimator 400. For example, the beam splitter 402 may be in contact with and connected to an end of the collimator 400. The beam splitter 402 may be optically aligned with an end of the lens opposite the end to which the ferrule is connected. In some embodiments, a protective sleeve may be utilized, and the beam splitter 402 may be housed within the protective sleeve. As mentioned above, any suitable beam splitter 402 may be utilized. For example, in some embodiments, the beam splitter 402 may be a glass, an optical film coating, or a cubic. As is generally understood, the beam splitter 402 may transmit a portion of light received by the beam splitter 402 therethrough, and may reflect another portion of the received light. The splitting ratio of the beam splitter 402 is usually 50:50, but any suitable splitting ratio can be provided. In exemplary embodiments, the beam splitter 402 may reflect 50% of the light and transmit 50% of the light. Alternatively, the beam splitter 402 may reflect between 40% and 60% of the light and transmit between 60% and 40% of the light, such as reflect between 45% and 55% of the light and transmit between 55% and 45% of the light. In other alternative embodiments, any suitable relative percentages of transmitted and reflected light may be utilized.

The transmitted light from the T/R fiber through the beam splitter 402 is captured by the second collimator 404, which can have either a dual or a single fiber ferrule with a GRIN lens typically. The fiber pigtail 100 of this collimator 402 may have similar core size as the T/R fiber 28. Accordingly, the large core fibers 28, 100 may capture most of the transmitted light from the T/R port if not all of the light. For example, the embodiment illustrated in FIG. 5A is for singlemode MPO cabling test, where the fiber under test 300 may have a core size of about 9 µm, such that the optical fiber 28 and/or 100 comprising a core size greater than the core size of the fiber under test 300 may have a core size of about 50 µm or greater. As another example, the embodiment illustrated in FIG. 5B may be used with multimode MPO cabling test 300, e.g., having a core size of about 50 µm, where the optical fiber 28 and/or 100 comprising a core size greater than the core size of the fiber under test 300 may have a core size of about 62.5 µm or greater. The embodiment of FIG. 5B also can be applied to singlemode testing applications. Also, it should be noted that the description and illustrations herein of a single enclosure for each assembly consisting of the components shown in FIGS. 5 and/or 5B is by way of example only and not limitation. For instance, alternative embodiments may include packaging multiple assemblies in a single enclosure to facilitate reducing the volume needed to house those assemblies, e.g., a single enclosure serving twelve fibers to/from the MPO test connector versus twelve individual enclosures, each servicing a single fiber to/from the MPO test connector 302. Furthermore, depending upon the application, the invention may incorporate optical thin film coatings, e.g., antireflective coatings, on some or all of the optical components in order to enhance its testing performance. For instance, applied AR coatings may reduce optical reflections that could negatively impact the measurement accuracy of some test parameters.

Figure 6:
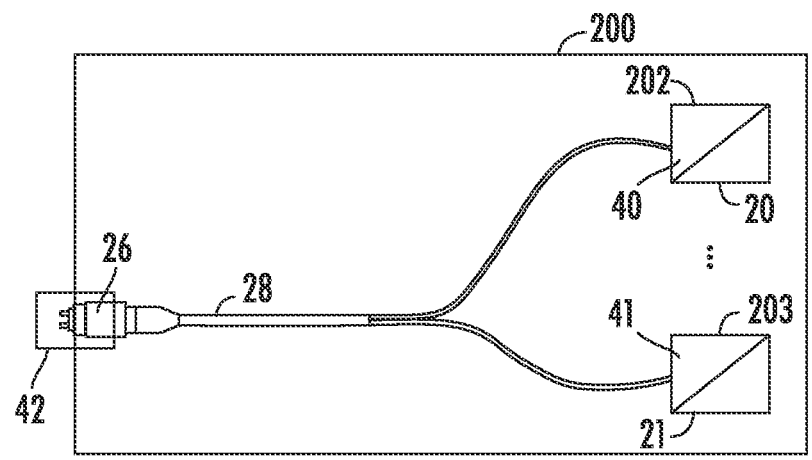
FIG. 6 provides a diagrammatic illustration of another exemplary optical power meter unit configuration.

In some embodiments, the light source LS 40 and the optical power meter PM 20 may be integrated into an optical sub-assembly (OSA) 202. For example, as illustrated in FIG. 6, the MPO optical power meter unit may integrate a LSPM 40/20 into an optical sub assembly (OSA) 202, which may eliminate a need for optical branching devices. In such embodiments, the optical fiber 28 may extend from the transmitting/receiving port TR 42 to one or more optical sub-assemblies OSA 202 and 203, e.g., without interruption by an optical branching device.

Figure 7A:
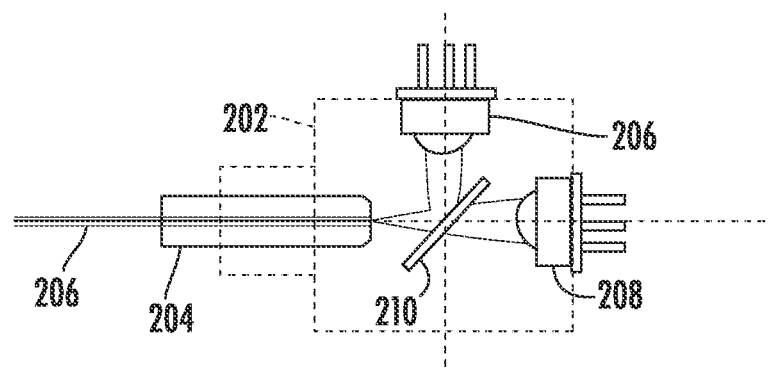
FIGS. 7A and 7B provide diagrammatic illustrations of exemplary optical arrangements of an optical sub-assembly which may be incorporated into the optical power meter unit of FIG. 6 in one or more embodiments of the present disclosure.
Figure 7B:
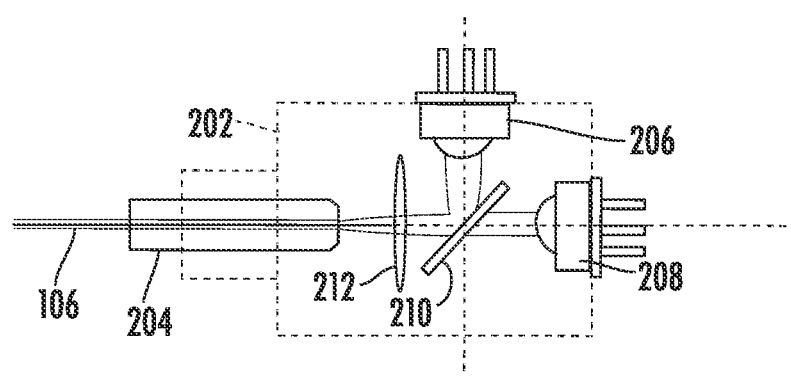

Two exemplary optical arrangements of the OSA 202 are depicted in FIGS. 7A and 7B. In the example arrangement illustrated by FIG. 7A, a single optical fiber 106 extends from the T/R port 42 (as shown in FIG. 6) to the OSA 202, and the single optical fiber 106 may be, for example, an individual large core MPO fanout fiber which extends from the T/R port 42 to a fiber end terminated with a fiber stub/ferrule 204. The end face of the fiber 106 can be flat or angle cleaved or polished. A photo detector (PD) 208 with a lensed optical window is coaxially placed with the fiber stub/ferrule 204, and in a head-to-head direction. The end face of the fiber 106 and the light sensing surface of the PD 208 are generally located in the conjugate planes of the PD window lens, to maximally capture the light emitted from the fiber 106. The fiber stub/ferrule 204 may be connected to the optical sub-assembly 202 and optically aligned with a beam splitter 210 of the optical sub-assembly 202. For example, the optical beam splitter 210 may be placed between the fiber stub/ferrule 204 and the PD 208, for diverting the light beam emitted from a light emitter 206, e.g., a LD or a LED, which has a lensed optical window, and injecting the light into the fiber 106. The end face of the fiber 106 and the light emitting surface of the LD/LED 206 are generally located in the conjugate planes of the window lens, for maximum light coupling efficiency. The beam splitter 210 can be glasses, optical film coating, a cubic, or any other feasible components, which can split the light into two beams, and combine two beams together vice versa. Its splitting ratio may be 50:50, but any suitable splitting ratio may be provided. Optical thin film coatings, e.g., WDM coatings, may be applied on the beam splitter 210, such as for wavelength selective splitting, or other purposes.

As another example, FIG. 7B illustrates an arrangement where the light emitted from the fiber 106 is collimated by a lens 212. Thus, beams projected into the PD 208 or emitted from the LD/LED 206 are all collimated. This arrangement may advantageously help improve both the light collection efficiency and the light coupling efficiency. Additionally, the arrangement depicted in FIGS. 7A and 7B are by way of example only. For example, the relative positions of the LD/LED 206 and the PD 208 within the OSA 202 may be exchanged with no effect on the functionalities thereof.

In various embodiments, optical power meter units of the present disclosure include at least one large core optical fiber extending between a T/R port and a power meter. The large core optical fiber has a core size that is larger than a core size of a fiber under test (the fiber under test may be connected or connectable to the T/R port of the power meter unit). Accordingly, the optical power meter units of the present invention may advantageously maximize the light coupling coefficient from the fiber under test into the power meter, hence significantly reducing the insertion loss of the MPO connection. Therefore, the loss measurement accuracy can be improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical power meter unit, comprising:
   a transmitting/receiving port configured to connect to a fiber under test;
   a light source;
   an optical power meter;
   an optical fiber extending between the transmitting/receiving port and the optical power meter, the optical fiber comprising a core size greater than a core size of the fiber under test; and
   an optical branching device, wherein the optical fiber extending between the transmitting/receiving port and the optical power meter comprises a first branch of the optical branching device, the optical branching device further comprising a second branch extending to the light source, wherein a core size of the second branch is less than the core size of the optical fiber extending between the transmitting/receiving port and the optical power meter.

2. The optical power meter unit of claim 1, wherein the optical branching device comprises a collimator and a beam splitter optically aligned with the collimator.

3. The optical power meter unit of claim 1, wherein the optical fiber extends from the transmitting/receiving port to the optical power meter.

4. The optical power meter unit of claim 1, wherein the light source and the optical power meter are integrated into an optical sub-assembly, wherein the optical fiber extends from the transmitting/receiving port to the optical sub-assembly.

5. The optical power meter unit of claim 4, wherein the optical fiber is terminated with a fiber stub/ferrule, the fiber stub/ferrule connected to the optical sub-assembly and optically aligned with a beam splitter of the optical sub-assembly.

6. The optical power meter unit of claim 1, wherein the core size of the optical fiber extending between the transmitting/receiving port and the optical power meter is at least about fifty microns.

7. The optical power meter unit of claim 6, wherein the core size of the fiber under test is about nine microns.

8. The optical power meter unit of claim 1, wherein the core size of the optical fiber extending between the transmitting/receiving port and the optical power meter is at least about sixty-two and a half microns.

9. The optical power meter unit of claim 6, wherein the core size of the fiber under test is about fifty microns.

10. An optical power meter unit, comprising:
    a transmitting/receiving port configured to connect to a fiber under test;
    a light source;
    an optical power meter; and
    an optical branching device connecting the light source and the optical power meter to the transmitting/receiving port, the optical branching device comprising a first branch extending between the transmitting/receiving port and the optical power meter and a second branch extending between the transmitting/receiving port and the light source, wherein a core size of the first branch is greater than a core size of the second branch, and wherein the core size of the first branch is greater than a core size of the fiber under test.

11. The optical power meter unit of claim 10, wherein the optical branching device comprises a collimator and a beam splitter optically aligned with the collimator, wherein the first branch of the optical branching device comprises a first optical pigtail extending between the transmitting/receiving port and the collimator and a second optical pigtail extending between the collimator and the optical power meter.

12. The optical power meter unit of claim 11, wherein the optical branching device further comprises a second collimator spaced from the first collimator, wherein the second branch of the optical branching device comprises a third optical pigtail extending from the light source to the first collimator and a fourth optical pigtail extending from the second collimator.

13. The optical power meter unit of claim 10, wherein the first branch of the optical branching device comprises a first optical fiber extending from the transmitting/receiving port to an optical switch and a second portion extending from the optical switch to the optical power meter.

14. The optical power meter unit of claim 10, wherein the core size of the first branch of the optical branching device is at least about fifty microns.

15. The optical power meter unit of claim 10, wherein the core size of the first branch of the optical branching device is at least about sixty-two and a half microns.

* * * * *